UNITED STATES PATENT OFFICE.

THOMAS J. MAYALL, OF ROXBURY, MASSACHUSETTS.

IMPROVEMENT IN RESTORING WASTE RUBBER.

Specification forming part of Letters Patent No. 40,491, dated November 3, 1863; antedated October 29, 1863.

*To all whom it may concern:*

Be it known that I, THOMAS J. MAYALL, residing in the city of Roxbury, in the county of Norfolk and State of Massachusetts, and a citizen of the United States of America, and the first and original inventor or discoverer of a new and useful mode, method, means, or process of divesting india-rubber or gutta-percha, separately or combined, whether subjected to the process of vulcanization or not, of the sulphur and fibrous materials, or either that have been mixed or combined therewith, in the manufacture of goods or articles; and I do hereby declare that said process has not been known or used by others before said discovery or invention, and that the following is a full, clear, and accurate description of the principle, nature, and character of said invention or discovery.

The nature or character of said invention consists in first reducing by any proper means waste vulcanized rubber, or rubber not vulcanized, with which sulphur, fibrous materials, or either have been combined, to a fine condition, and then subjecting it in any suitable vessel to the direct action of the flames of gas, or of inflammable liquids—such as camphene, alcohol, spirits of wine, benzine, carbon-oil, &c—the duration of heat thus applied being regulated by any suitable extinguishing apparatus. By this means I have found that old waste rubber, whether vulcanized or not—such as scraps of shoes, car-springs, and other articles—becomes reduced to such a gummy, plastic, and cohesive condition as to be readily reworked and molded into any desired shape, possessing properties or qualities it had before being subjected to the process of vulcanization. It will be observed that the waste rubber is subjected to the direct action of the flames of inflammable liquids or gases, the effect of which is, when the process is properly conducted, as hereinafter described, to completely consume and destroy such foreign matters in the waste rubber as are most desirable to be removed, the result of which is the production of a mass of rubber that is as nearly as possible suitable for being used in the manufacture of vulcanized rubber goods.

The process by which the results hereinbefore described are produced is as follows: I take any kind of waste rubber or gutta-percha, whether vulcanized or not, and reduce it by grinding, chopping, or otherwise to a fine condition. A portion of this I place in any suitable vessel, and sprinkle or saturate it with alcohol, camphene, carbon or coal oil, or other inflammable liquids. Over this I place another layer of the reduced rubber, which is also sprinkled or saturated with the inflammable liquid. When the vessel is full, the liquid is ignited, and the flame is allowed to act upon the rubber as long as may be deemed necessary to produce the result as herein above described.

It will be evident that in lieu of applying the flames of spirits to the waste rubber, (though I consider this the simplest and best method,) jets of lighted gas may be brought to bear upon it in any proper manner, it being desirable, however, that the flames should be in contact with every portion or layer of the waste rubber, and not simply upon one large mass of the same. The product thus obtained may be rolled into sheets or molded into various forms, or worked in any of the various modes practiced by india-rubber manufacturers. It may then be subjected to artificial heat, or simply to the action of the sun and air. Any of the various compounds commonly used may be combined with this restored rubber, and it may be vulcanized, if desirable, under pressure.

By my process it will be seen that two of its important features are its trifling cost and the safety with which it may be worked.

What I claim as my invention or discovery, and desire to secure by Letters Patent, is—

The process or means, as herein described, by which sulphur or fibrous materials, or either, which have been combined with india-rubber or gutta-percha, separately or combined, before being subjected to the process of vulcanization, and whether vulcanized rubber articles or not, by subjecting the same to the flame of inflammable liquids or gases—such as spirits of turpentine, camphene, petroleum or carbon oil, alcohol, benzine, benzole, naphtha, or any other inflammable liquids or gases producing the same result—substantially as set forth.

In testimony whereof I have signed my name to this specification before two subscribing witnesses.

THOS. J. MAYALL.

Witnesses:
JOSEPH GAVETT,
A. W. BROWN.